United States Patent [19]

Huege

[11] Patent Number: 5,792,440
[45] Date of Patent: Aug. 11, 1998

[54] METHOD OF MANUFACTURING HIGH PURITY CALCIUM CARBONATE

[75] Inventor: Fred R. Huege, Colleyville, Tex.

[73] Assignee: Chemical Lime Company, Fort Worth, Tex.

[21] Appl. No.: 779,375

[22] Filed: Jan. 7, 1997

Related U.S. Application Data

[63] Continuation of Ser. No. 530,607, Sep. 20, 1995, abandoned.

[51] Int. Cl.[6] .................................................. C01F 11/18
[52] U.S. Cl. .............................................. 423/432; 423/640
[58] Field of Search .................................... 423/432, 640

[56] References Cited

U.S. PATENT DOCUMENTS

| | | | |
|---|---|---|---|
| 2,538,802 | 1/1951 | Schur et al. | 23/66 |
| 2,631,922 | 3/1953 | Schur et al. | 23/66 |
| 2,962,350 | 11/1960 | Trubey et al. | 23/66 |
| 3,443,890 | 5/1969 | Sisson et al. | 23/66 |
| 4,133,894 | 1/1979 | Shibazaki et al. | 423/432 |
| 4,367,207 | 1/1983 | Vanderheiden | 423/432 |
| 4,411,879 | 10/1983 | Ehrlich et al. | 423/640 |
| 4,714,603 | 12/1987 | Vanderheiden | 423/432 |
| 4,894,217 | 1/1990 | Östman | 423/659 |
| 4,900,533 | 2/1990 | Malden | 423/430 |
| 5,232,678 | 8/1993 | Bleakley et al. | 423/432 |
| 5,342,600 | 8/1994 | Bleakley et al. | 423/432 |
| 5,376,343 | 12/1994 | Fouche | 423/165 |

OTHER PUBLICATIONS

Robert S. Boynton, *Chemistry and Technology of Lime and Limestone*, Interscience Publishers, (1966), pp. 267, 268.

*Primary Examiner*—Wayne Langel
*Attorney, Agent, or Firm*—Charles D. Gunter, Jr.

[57] ABSTRACT

Flue gases exhausted from a lime kiln containing lime kiln dust are treated to produce a high purity calcium carbonate precipitate. This is accomplished by passing the flue gases from the lime kiln through a kiln dust separator so that lime kiln dust containing calcium oxide is removed from the remaining flue gas. The lime kiln dust is mixed with water so that an aqueous suspension of the lime kiln dust is formed. Quicklime or calcium oxide in the lime kiln dust is thus hydrated to form calcium hydroxide. The solids within the suspension are then allowed to settle so that a clear, saturated solution of calcium hydroxide having a pH of about 12.4 is formed. This solution is then contacted with carbon dioxide gas so that the calcium hydroxide reacts to form a high purity calcium carbonate precipitate. This high purity calcium carbonate precipitate is then allowed to settle from supernatant water of the solution. The high purity calcium carbonate is separated from the supernatant water, while the supernatant water is used as the water mixed with the lime kiln dust to form the aqueous suspension.

19 Claims, 3 Drawing Sheets

METHOD OF MANUFACTURING HIGH PURITY CALCIUM CARBONATE

This is a continuation of application Ser. No. 08/530,607, filed Sep. 20, 1995, abandoned.

BACKGROUND OF THE INVENTION

1. Field of the Invention

This invention relates generally to a method of producing high purity calcium carbonate and, more specifically to a method of treating flue gases exhausted from a lime kiln to manufacture high purity precipitated calcium carbonate.

2. Description of the Prior Art

Because of environmental concerns, lime kilns for calcining limestone are provided with means for controlling particulate emissions from exhausted flue gases of the lime kiln. Particulate matter exhausted from these lime kilns is usually comprised of quicklime (CaO), limestone fines ($CaCO_3$) and fuel residues, such as coal ash or oil. The amount of this material may make up between 5 to 50% of the exhausted flue gases. This particulate matter or lime kiln dust (LKD) is dark gray in color and has little commercial value. Some of the lime kiln dust may be sold for a minimum value or it may be added to the quicklime product, if possible. The majority of the collected lime kiln dust, however, must be disposed of.

Collecting of the lime kiln dust is accomplished by means of wet or dry scrubbing of the flue gases. In dry scrubbing, the lime kiln dust is removed by means of cyclone or bag house filtering equipment wherein the lime kiln dust is removed and collected from the remainder of the flue gases without the necessity of wetting the particulate matter. In wet scrubbing, water is sprayed into and mixed with the flue gases to capture the dust particles so that the lime kiln dust is collected as a slurry. The lime kiln dust slurry water from the wet scrubber is then impounded in a lagoon or pond where the solids are allowed to settle out. The water is then recirculated into the scrubber or used for other purposes. As the lime kiln dust solids increase in the impound pond, they may be periodically removed and disposed of.

Precipitated calcium carbonate is a widely used pigment in both the paper and plastics industries. It is also used in many other applications depending on its purity, particle size and brightness. High quality pigment grade precipitated calcium carbonate is normally produced by first slaking quicklime to form a 5 to 30% solids milk of lime slurry and then bubbling carbon dioxide ($CO_2$) gas into the slurry. This reaction is very simple and by controlling the reaction conditions, different size and shaped particles can be formed. The brightness of the material is dependent on the quality of the quicklime and the ability to remove the large grit particles from the suspension of calcium hydroxide. If the quicklime has high levels of iron or manganese, then the brightness of the precipitated calcium carbonate product will be low.

It is therefore an object of this invention to provide a method of producing high purity calcium carbonate, such as is suitable for use as such pigments, without the necessity of forming a conventional slaked quicklime suspension, or by using only the clear supernatant from the milk of lime suspension thus formed.

It is another object of this invention to provide a method of treating exhaust flue gases from a lime kiln to remove valuable materials which would otherwise be disposed of using conventional techniques.

It is another object of the invention to provide a method of producing high purity calcium carbonate from the treatment of such flue gases.

Another object of the invention is to produce high purity calcium carbonate from lime kiln dust by using such by-product to form a clear solution of saturated calcium hydroxide.

Another object of the invention is to produce very pure and high brightness precipitated calcium carbonate by bubbling $CO_2$ into the clear water obtained from wet scrubbing lime kilns.

SUMMARY OF THE INVENTION

A method of producing high purity calcium carbonate is shown in which a source of calcium oxide is combined with water to form an aqueous suspension. The calcium oxide is allowed to hydrate to form calcium hydroxide. The solids within the aqueous suspension are allowed to settle so that a clear, saturated solution of calcium hydroxide is formed. The clear, saturated solution of calcium hydroxide is contacted with carbon dioxide gas so that the calcium hydroxide reacts with the carbon dioxide to form high purity calcium carbonate precipitate. The high purity calcium carbonate precipitate is allowed to settle and is separated out.

Preferably, the source of calcium oxide is a by-product of the treatment of flue gases containing lime kiln dust exhausted from a lime kiln. The source of calcium oxide is obtained by passing the flue gases through a lime kiln dust separator. Lime kiln dust containing calcium oxide is thus removed from the remainder of the flue gases. The removed lime kiln dust is mixed with water so that an aqueous suspension of the lime kiln dust is formed. This allows calcium oxide contained within the lime kiln dust to be hydrated to form calcium hydroxide. Solids within the suspension are allowed to settle so that a clear, saturated solution of calcium hydroxide is formed. The saturated solution of the calcium hydroxide is then contacted with carbon dioxide gas so that the calcium hydroxide reacts to form a high purity calcium carbonate precipitate. The calcium carbonate precipitate is allowed to settle from supernatant water of the solution. The precipitate is separated from the supernatant water and the supernatant water may then be recycled and used as the water that is mixed with the removed lime kiln dust to form the suspension as previously described.

Additional objects, features and advantages will be apparent from the written description which follows.

DETAILED DESCRIPTION OF THE INVENTION

Figure 1:
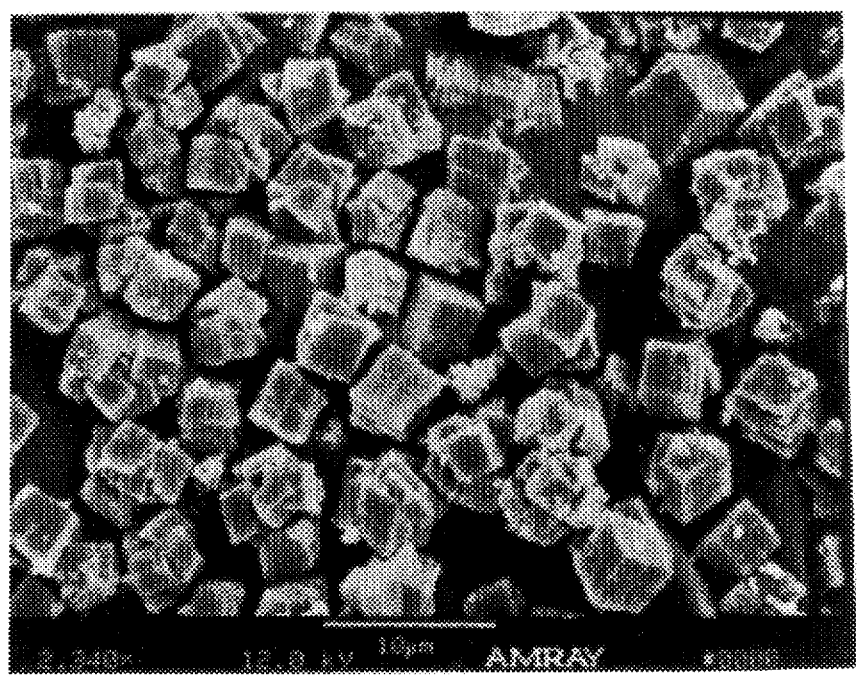
FIG. 1 is a photograph of precipitated calcium carbonate particles shown magnified by means of an electron microscope and formed in accordance with the method of the invention.

The practice of the present invention requires a source of calcium oxide which may be relatively impure. One convenient source is lime kiln dust (LKD), a by-product of limestone calcining operations, although other sources of calcium oxide could be utilized such as cement kiln dust, fly ash, or other calcium oxide/calcium hydroxide containing materials. In modern quicklime production facilities, flue gases exhausted from lime kilns during calcining operations have to be processed in order to remove entrained particles that would otherwise be released into the air. These particles are commonly removed by means of filtering or scrubbing as either dry or wetted particles. The lime kiln dust particles are coarse, dark gray or brown particles. In wet scrubbing, water is sprayed into the flue gases to capture the particles so that the lime kiln dust particles are collected as part of an aqueous slurry. The slurry is then transferred to an impound pond and the solids are allowed to settle from suspension. After settling has occurred, the clear water may be recirculated into the scrubber. As the level of solids increase within the impound pond, they may be removed and disposed of.

It is been found that the lime kiln dust removed from the flue gases can be utilized to produce a commercially valuable material in the form of high purity calcium carbonate. The lime kiln dust from slurries formed from wet scrubbing or, alternatively, slurries from dry lime kiln dust which has been collected and mixed with water, rapidly settles out of suspension. The quicklime removed from the flue gases reacts with the slurry water to form calcium hydroxide. The vast majority of this calcium hydroxide is retained in the lime kiln dust that settles from suspension, but because calcium hydroxide has a very slight solubility in water, the water quickly becomes saturated with calcium hydroxide. The solubility of calcium hydroxide and water varies with temperature, but is approximately 0.15% by weight. In most cases, because of the large volume of solution treated, the temperature of the solution will be at ambient temperature, i.e., approximately 20° to 45° C.

The solubility of calcium carbonate is much less than that of calcium hydroxide. It is this difference in solubility that allows the precipitate of calcium carbonate to form. The concentration of precipitate calcium carbonate in suspension is only 0.1 to 0.2% solids. This very dilute suspension of precipitate calcium carbonate is dewatered by settling and filtration. The calcium carbonate can then be sold as a high solid slurry or further dried and sold as a dry powder. By utilizing a very dilute suspension of precipitated calcium carbonate and concentrating the solids in a clarifier/ thickener, the clear supernatant can then be returned to the scrubber for the wet scrubbing of the flue gases. Thus, the process, although utilizing large amounts of water can be recycled in a closed loop system. While the amount of calcium carbonate produced may be very small compared to the volume of water treated, i.e., approximately 0.15 pounds of calcium carbonate for every one gallon of suspension, typical calcining plants can treat millions of gallons per day.

Figure 2:
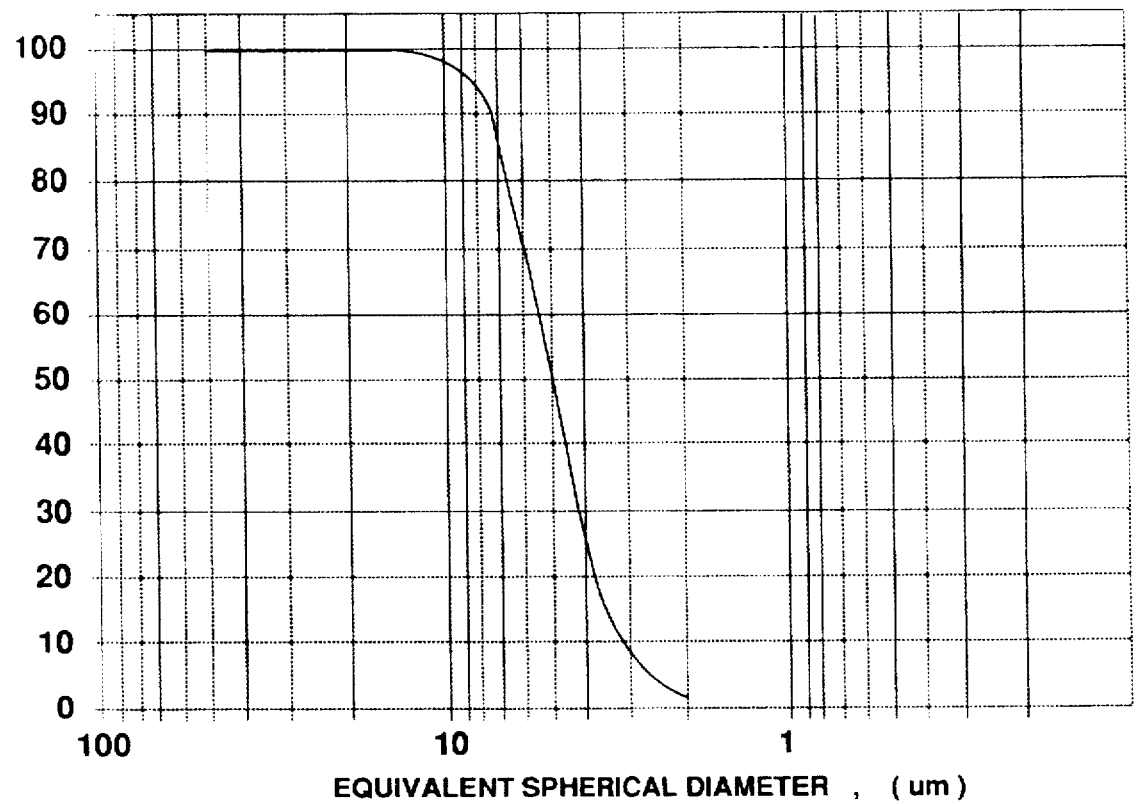
FIG. 2 is a graph showing the size distribution of calcium carbonate particles formed in accordance with the method of the invention.

One of the benefits of the calcium carbonate produced when treating the lime kiln dust removed from the flue gases, is that the particles of calcium carbonate produced are of high purity and uniform particle size. As used herein, the term "high purity" refers to the quality of having less than about 1% by weight impurities. FIG. 1 shows an electron microscope photograph of precipitated calcite particles magnified 2,340 times produced using the method of the invention. As can be seen, the calcium carbonate particles are of the predominately calcite variety and are cuboidal in shape and of generally uniform size. FIG. 2 illustrates the typical size distribution of calcite particles produced in accordance with method of the invention. As can be seen, over ninety percent of the particles have an equivalent spherical diameter of between 2 to 10 microns.

Figure 3:
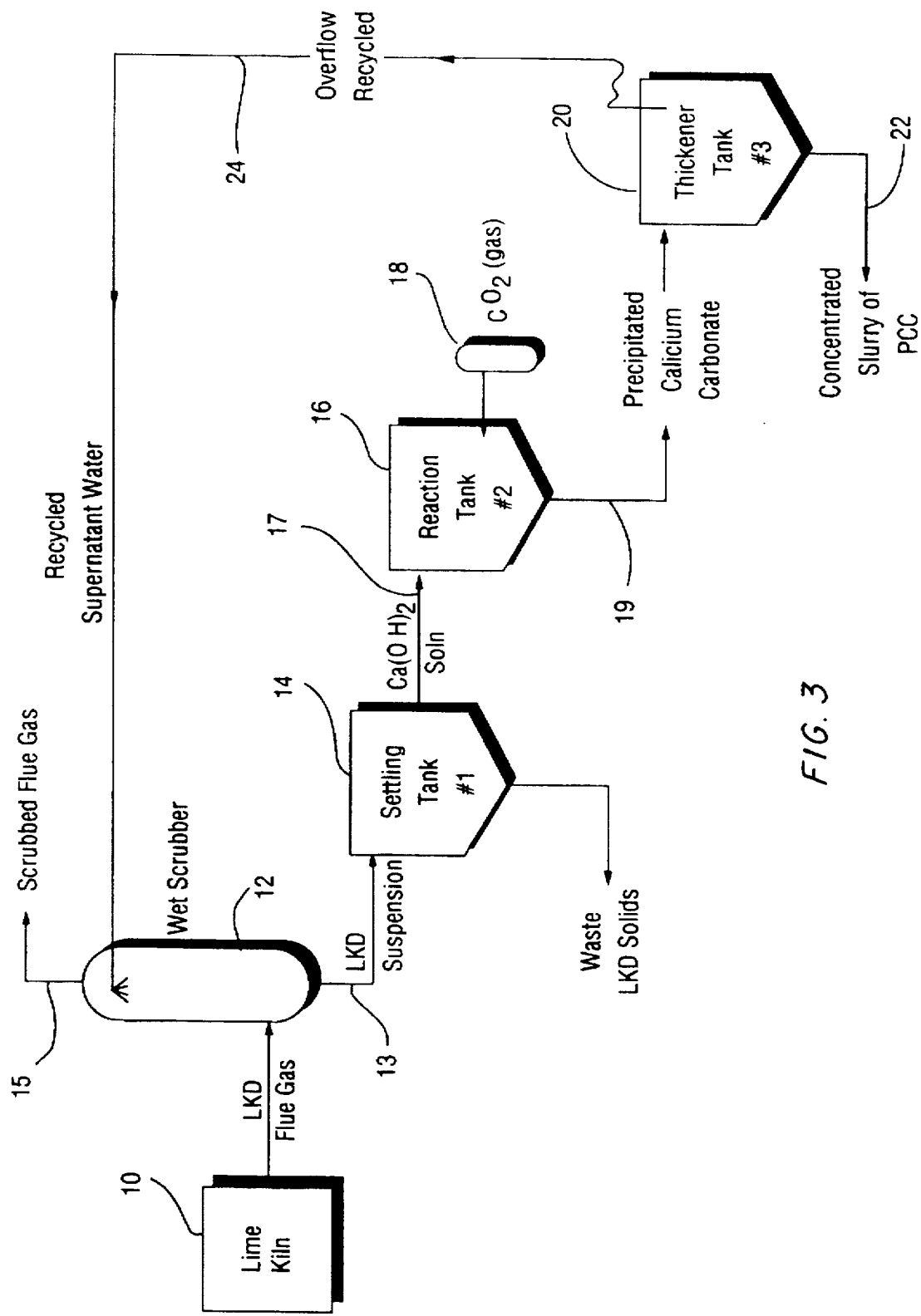
FIG. 3 is a process flow diagram for the production of high purity calcium carbonate in accordance with one method of the invention.

FIG. 3 shows a process flow diagram for treating lime kiln flue gases to form the calcium carbonate product. Flue gases containing lime kiln dust from lime kiln 10 are introduced into a lime kiln dust separator 12, in this case a wet scrubber. It should be noted that although a wet scrubber is utilized, other lime kiln dust filtering means may also be used, such as cyclone and bag filters. In fact, the saturated calcium hydroxide solution which is formed in accordance with the method of the invention could be obtained by the conventional method of slaking quicklime, but only the clear supernatant from the milk of lime must be used. If dry scrubbing or filtering of lime kiln dust is used, the filtered lime kiln dust is mixed with water to provide an aqueous suspension. In the case of the wet scrubber 12, shown in FIG. 3, flue gases containing lime kiln dust are contacted with water so that the lime kiln dust is wetted and carried as an aqueous lime kiln dust slurry through a discharge conduit 13 to a impound pond or settling tank 14. The scrubbed flue gases are vented to the atmosphere from the top of the wet scrubber 12 through a vent 15.

In the first stage settling tank 14, waste lime kiln dust solids are allowed to settle from suspension. Most of the calcium hydroxide formed from the hydration reaction of quicklime with water from the wet scrubber 12 will settle out of suspension within the tank 14 so that the water is clear. A slight amount of calcium hydroxide, however, will remain in solution with the water of the settling tank 14. Generally, it can be determined that a saturated solution of calcium hydroxide is achieved by monitoring the pH of the water within the settling tank 14. When the pH of the solution within the tank 14 reaches approximately 12.4, saturation has occurred. At this pH all heavy metal impurities contained in the lime kiln dust will be precipitated out of solution so that only calcium ions are present. Some small amounts of sodium and potassium ions may also be present in the water but they do not enter into the reaction.

This clear, saturated solution of calcium hydroxide is then transferred to a second stage reaction tank 16 by means of conduit 17. Waste lime kiln dust solids may be removed from the first settling tank 14 for further processing or disposal. The calcium hydroxide solution within the settling tank 16 is contacted with carbon dioxide gas from a $CO_2$ storage tank 18 or from the exhaust gases from the lime kiln operation. Carbon dioxide gas bubbled through the solution within reaction tank 16 reacts with the calcium hydroxide to form a high purity calcium carbonate precipitate. Aeration devices are known in the art for bubbling carbon dioxide gas through the solution. An alternative arrangement is to introduce the gas stream into the solution via ceramic microfilter elements by which the gas stream is broken up into a multiplicity of minute gas streams. See, e.g., U.S. Pat. No. 5,376,343, to Fouche, issued Dec. 27, 1994. By whatever means, the solution within the reaction tank 16 should preferably be contacted with carbon dioxide until the pH of the solution is between about 8 to 11. At pHs lower than this, the calcium concentration has been found to be higher for the calcium carbonate filtrate. This may be because of the higher solubility of calcium ions at lower pHs due to soluble calcium bicarbonate being formed.

The high purity calcium carbonate precipitate is then withdrawn from the second stage reaction tank 16 through a discharge conduit 19 and may be further processed either to form a concentrated solids suspension utilizing a clarifier/ thickener or may be filtered and dried to form a powder. Further washing may also be carried out if necessary. In the embodiment of FIG. 3, the high purity calcium carbonate precipitate is passed to a third stage thickener tank 20 to produce a concentrated slurry which can be withdrawn through a discharge line 22. Overflow of clear supernatant water from the thickener tank 20 is recycled through a conduit 24 back to the wet scrubber 12 and used as the water mixed with the flue gases to remove the lime kiln dust. Thus, the process can be continuously carried out with water used in wet scrubbing being recycled continuously to scrub flue gases from the lime kiln.

The following are examples of lime kiln dust slurries from scrubbers used in scrubbing exhausted flue gases that have been treated in accordance with the invention.

EXAMPLE 1

Water from a lime kiln's wet scrubber was allowed to settle to remove all the solid impurities. Four gallons of this clear wet scrubber water was placed in a five gallon container. Without stirring, $CO_2$ gas from a $CO_2$ gas cylinder was bubbled into the clear water until the pH decreased from approximately 12.4 to approximately 8.0 so that a white, fluffy calcium carbonate precipitate was formed. The calcium carbonate precipitate was filtered on a vacuum filter. The clear feed scrubber water and the filtrate were analyzed for calcium. The feed had a concentration of 1290 PPM while the filtrate contained only 450 PPM. Thus 840 PPM of calcium ions were precipitated as calcium carbonate. The precipitated calcium carbonate (PCC) had an average particle size of 12 microns and a surface area of 4.3 $m^2$/gm. The brightness of the PCC as measured on a Hunter L,a,b scale was 100, 0.0, −0.2, respectively. This is much higher in brightness than normal PCC made from milk of lime slurry.

EXAMPLE 2

A series of experiments with clear scrubber water containing 1152 PPM of calcium ions were performed. $CO_2$ was bubbled into the clear scrubber water until the pH decreased. The range of experiments were from a pH of 6.9 to a pH of 11.0. The PCC was filtered from the scrubber water and the filtrate analyzed. There was little or no difference in the concentration of calcium ions in the filtrate from a pH of 8.3 to 11.0, they varied from 327 to 364 PPM calcium. However, when the pH decreased to 6.9 the filtrate calcium concentration increased to 703 PPM. The particle size of the PCC formed form a pH of between 8 to 11 varied form an average of 2 to 8 microns and a surface area of 1.2 to 8 $m^2$/gm.

EXAMPLE 3

Lime kiln dust was removed from dry scrubbers of lime kilns. 500 grams of LKD was added to 17,000 grams of tap water, the LKD residue was removed and the supernatant used for carbonation. This process was repeated three times using the previously used filtrate water and LKD as feed for the next cycle.

The following high purity calcium carbonate precipitate was formed using the methods described above.

| Chemical | | |
|---|---|---|
| $CaCO_3$ | 99.88% | by weight |
| $MgCO_3$ | 0.00% | |
| $Fe_2O_3$ | 0.00% | |
| $Al_2O_3$ | 0.01% | |
| $SiO_2$ | 0.01% | |
| $Na_2O$ | 0.10% | |

-continued

| Physical | |
|---|---|
| Brightness: | |
| L = 100.0 | X = 94.5 |
| a = 0.0 | Y = 99.9 |
| b = −0.2 | Z = 107.3 |

Particle size: 2–10 microns (Average)
+325 mesh residue: 0.01%
Surface area: 3–5 $m^2$/gm
Oil absorption: 33 lbs oil/100 lbs pigment (ASTM D 281)

The method of the invention has several advantages over the prior art. High purity calcium carbonate can be produced utilizing a waste stream which would otherwise be discarded. The process forms a high purity calcium carbonate precipitate from a clear solution of calcium hydroxide formed from the waste lime kiln dust suspensions. The supernatant from the precipitate calcium carbonate can then be recycled to use as the water forming the aqueous suspension of lime kiln dust or as a scrubbing water for wet scrubbing of flue gases. The particles produced are of uniform particle size and shape and can be used in a wide area of applications where high purity calcium carbonate is used, such as for pigment in the paper and plastics industries.

While the invention has been shown in only one of its forms, it should be apparent to those skilled in the art that is not thus limited but is susceptible to various changes and modifications without departing from the scope of the invention.

What is claimed is:

1. A method of producing high purity calcium carbonate, the method consisting essentially of:

combining a source of calcium oxide or calcium hydroxide with water to form an aqueous suspension;

allowing the calcium oxide in the aqueous suspension to hydrate to form calcium hydroxide;

allowing solids within the suspension to settle so that the remaining supernatant water consists essentially of a clear, saturated solution of calcium hydroxide;

contacting the supernatant water which consists essentially of the clear, saturated solution of calcium hydroxide with carbon dioxide gas so that the calcium hydroxide reacts with the carbon dioxide to form a high purity calcium carbonate precipitate;

allowing the high purity calcium carbonate precipitate to settle from supernatant water of the solution; and then separating the high purity calcium carbonate from the supernatant water.

2. A method of producing high purity calcium carbonate from lime kiln dust exhausted from a lime kiln, the method consisting essentially of:

mixing lime kiln dust containing calcium oxide with water so that an aqueous suspension is formed, and wherein calcium oxide in the lime kiln dust is hydrated to form calcium hydroxide;

allowing solids within the suspension to settle so that a clear, saturated solution of calcium hydroxide is formed;

contacting the clear, saturated solution of calcium hydroxide with carbon dioxide gas so that the calcium hydroxide reacts with the carbon dioxide to form a high purity calcium carbonate precipitate;

allowing the high purity calcium carbonate precipitate to settle from supernatant water of the solution;

separating the high purity calcium carbonate from the supernatant water; and wherein the supernatant water is recycled and used as the water mixed with the lime kiln dust to form the suspension.

3. The method of claim 2, wherein:

the saturated solution of calcium hydroxide has a pH of about 12.4.

4. The method of claim 3, wherein:

the solution of calcium hydroxide is contacted with carbon dioxide until the pH of the solution ranges from about 6.0 to 12.0.

5. The method of claim 2, wherein:

at least 90% of the calcium carbonate precipitate has a particle size ranging between about 2 to 10 microns.

6. The method of claim 2, wherein:

the calcium carbonate precipitate is in the form of particles having a generally cuboidal-shaped crystalline structure.

7. The method of claim 2, wherein:

the high purity calcium carbonate precipitate contains less than 1% impurities.

8. A method of treating flue gases containing lime kiln dust exhausted from a lime kiln wherein one of the byproducts of such treatment is high purity calcium carbonate, the method consisting essentially of:

passing flue gases exhausted from the lime kiln through a kiln dust separator so that lime kiln dust containing calcium oxide is removed;

mixing the removed lime kiln dust with water so that an aqueous suspension of the lime kiln dust is formed, and wherein the calcium oxide in the lime kiln dust is hydrated to form calcium hydroxide;

allowing solids within the suspension to settle so that a clear, saturated solution of calcium hydroxide is formed;

contacting the clear, saturated solution of calcium hydroxide with carbon dioxide gas so that the calcium hydroxide reacts with the carbon dioxide to form a high purity calcium carbonate precipitate;

allowing the high purity calcium carbonate precipitate to settle from supernatant water of the solution;

separating the high purity calcium carbonate precipitate from the supernatant water; and wherein the supernatant water is recycled and used for mixing with the lime kiln dust to form the suspension.

9. The method of claim 8, wherein:

the saturated solution of calcium hydroxide has a pH of about 12.4.

10. The method of claim 9, wherein:

the solution of calcium hydroxide is contacted with carbon dioxide until the pH of the solution reaches about 8.0.

11. The method of claim 8, wherein:

the lime kiln dust separator is a wet scrubber and the lime kiln dust is mixed with the water from the wet scrubber to form the suspension.

12. The method of claim 8, wherein:

at least 90% of the calcium carbonate precipitate has a particle size ranging between about 2 to 10 microns.

13. The method of claim 8, wherein:

the calcium carbonate precipitate is in the form of particles having a generally cuboidal-shaped crystalline structure.

14. The method of claim 8, wherein:

the high purity calcium carbonate precipitate contains less than 1% impurities.

15. A method of treating flue gases containing lime kiln dust exhausted from a lime kiln to produce high purity calcium carbonate having a generally cuboidal-shaped crystalline structure, the method comprising:

passing flue gases exhausted from the lime kiln through a kiln dust separator so that lime kiln dust containing calcium oxide is removed from the flue gas;

mixing the lime kiln dust with water so that an aqueous suspension of the lime kiln dust is formed, and wherein the calcium oxide in the lime kiln dust is hydrated to form calcium hydroxide;

allowing solids within the suspension to settle so that a clear, saturated solution of calcium hydroxide having a pH of about 12.4 is formed;

contacting the clear, saturated solution of calcium hydroxide with carbon dioxide gas so that the calcium hydroxide reacts with the carbon dioxide to form a high purity calcium carbonate precipitate in the form of particles having a generally cuboidal-shaped crystalline structure;

allowing the high purity calcium carbonate precipitate to settle from supernatant water of the solution; then separating the high purity calcium carbonate precipitate from the supernatant water; and then recycling the supernatant water as the water mixed with the lime kiln dust to form the aqueous suspension.

16. The method of claim 15, wherein:

the solution of calcium hydroxide is contacted with carbon dioxide until the pH of the solution reaches about 8.0.

17. The method of claim 15, wherein:

the lime kiln dust separator is a wet scrubber and the lime kiln dust is mixed with water from the wet scrubber to form the suspension.

18. The method of claim 15, wherein:

at least 90% of the calcium carbonate precipitate has a particle size ranging between about 2 to 10 microns.

19. The method of claim 15, wherein:

the high purity calcium carbonate precipitate contains less than 1% impurities.

* * * * *